United States Patent
Chiang et al.

(10) Patent No.: US 7,176,983 B2
(45) Date of Patent: Feb. 13, 2007

(54) ADAPTIVE CORING FOR VIDEO PEAKING

(75) Inventors: Patricia Wei Yin Chiang, Singapore (SG); Lucas Y. W. Hui, Singapore (SG)

(73) Assignee: STMicroelectronics Asia Pacific Pte. Ltd., Singapore (SG)

( * ) Notice: Subject to any disclaimer, the term of this patent is extended or adjusted under 35 U.S.C. 154(b) by 386 days.

(21) Appl. No.: 10/850,963

(22) Filed: May 20, 2004

(65) Prior Publication Data
US 2005/0012866 A1    Jan. 20, 2005

(30) Foreign Application Priority Data
May 21, 2003   (SG)  ................................. 200303239

(51) Int. Cl.
*H04N 5/21* (2006.01)
(52) U.S. Cl. .................... 348/630; 348/627; 348/712
(58) Field of Classification Search ................ 348/712, 348/708, 713, 630, 631, 627, 625; 382/266, 382/275; H04N 5/21, 5/213, 9/77
See application file for complete search history.

(56) References Cited

U.S. PATENT DOCUMENTS 6,377,313 B1 *  4/2002  Yang et al.  ................. 348/630
7,106,386 B2 *  9/2006  Kobayashi  ................... 348/625

* cited by examiner

*Primary Examiner*—Sherrie Hsia
(74) *Attorney, Agent, or Firm*—Lisa K. Jorgenson; Robert Iannucci; Seed IP Law Group PLLC

(57) ABSTRACT

A processor for enhancing an input luminance signal including: a circuit for calculating a chroma edge value associated with the input luminance signal; a circuit for measuring a luminance gradient associated with the input luminance signal; a peaking filter for processing the input luminance signal; a gain adjustment circuit having a gain function that is adjustable relative to the calculated chroma edge value, the gain adjustment circuit being operable to adjust the magnitude of the output of the peaking filter wherein: in a first range of luminance gradients, the output is an attenuated version of the input; in a second range of luminance gradients the output is directly proportional to the input; in a third range of luminance gradients, the output is inversely proportional to the input; wherein the enhanced luminance signal is the sum of the input and output of the peaking filter.

74 Claims, 6 Drawing Sheets

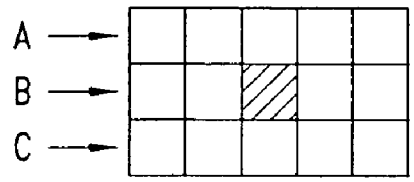
FIG. 2A
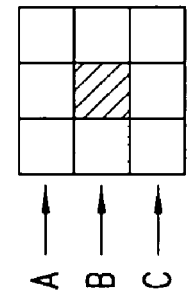
FIG. 2B
FIG. 3A
FIG. 3B

ADAPTIVE CORING FOR VIDEO PEAKING

BACKGROUND OF THE INVENTION

1. Field of the Invention

The present invention relates to video signal processing and in particular to a means of enhancing the sharpness of video images.

2. Description of the Related Art

Video peaking techniques have been used to enhance the sharpness of video images. Conventional video peaking techniques typically involve enhancing the "edges" or transition regions within an image by filtering a luminance signal with a high-pass or band-pass filter, scaling the filtered signal with a gain factor, then adding the scaled signal with the original luminance signal to generate an output signal having sharper edges.

Prior art inventions also tend to involve the use of peaking techniques in combination with noise coring techniques which is the process by which a range of signal levels are suppressed (i.e., are not peaked) so as to avoid amplifying the visible noise in the signal.

For instance, prior art document U.S. Pat. No. 6,377,313 discloses an edge enhancement circuit that comprises a high pass filter for filtering an input signal, a noise coring circuit to remove the filtered signal below a defined magnitude, and, a circuit in parallel to the coring circuit to derive a variable peaking strength.

However, prior art solutions are problematic in that, whilst they enhance the edge components of a video signal, they also tend to amplify noise components of the signal which occupy the same frequency range. This results in visible distortion in the displayed video image. Moreover, the noise characteristics of a video signal may vary throughout the signal, and prior art peaking techniques are not sensitive to these fluctuations meaning that optimal peaking and noise coring is difficult to achieve.

Another problem inherent in prior art inventions is that they are unable to scale the filtered signal such that weak edges are enhanced without over-enhancing strong edges.

It is also noted that video transmission signals interleave luminance and chrominance components of a video signal as a "composite signal". Prior art techniques employ notch filters to decode the chrominance components from the luminance component of the composite signal. However, these filters tend to leave residual chroma in the luminance signals which is susceptible to peaking and appears as moving noise when peaked.

The present invention seeks to alleviate at least some of the problems discussed above.

BRIEF SUMMARY OF THE INVENTION

In a first broad form, the present invention provides a processor for enhancing an input luminance signal including: a means for calculating a chroma edge value associated with the input luminance signal; a means for measuring a luminance gradient associated with the input luminance signal; a peaking filter for processing the input luminance signal; a gain adjustment circuit having a gain function that is adjustable relative to the calculated chroma edge value, the gain adjustment circuit being operable to adjust the magnitude of the output of the peaking filter wherein: in a first range of luminance gradients, the output is an attenuated version of the input; in a second range of luminance gradients the output is directly proportional to the input; in a third range of luminance gradients, the output is inversely proportional to the input; wherein said enhanced luminance signal is the sum of the input and output of the peaking filter. Preferably, the input luminance signal represents an inter-pixel array for display. More preferably, the input luminance signal represents a two-dimensional pixel array.

Preferably, the chroma edge value includes the sum of chroma gradients of a first and a second chroma signal associated with the input luminance signal. More preferably, the means for calculating the chroma edge value includes an edge detector. Typically, the edge detector includes a pair of Sobel detectors, however, a person skilled in the art would appreciate that any other suitable choice of edge detector may be used. Advantageously, by detecting the chroma gradients in the first and second chroma signals associated with the input luminance signal, the presence of chroma residues in the luminance signal may be located and suppressed. More preferably the means for measuring the chroma gradients includes a pair of Sobel detectors. It would be understood by a person skilled in the art that in alternative embodiments of the present invention the chroma edge value may include the measurement of a single chroma gradient in a single chroma signal associated with the luminance signal.

Preferably, the luminance gradient corresponds to the difference between a maximum and a minimum pixel luminance within the inter-pixel array.

Preferably, the luminance gradients within the first range are smaller than the luminance gradients within the second range, and, the luminance gradients within the second range are smaller than the luminance gradients within the third range. Advantageously, the order of the ranges enables peaking of small details in images without over-enhancing larger details.

Preferably, the gain function of the gain adjustment circuit may be further adjustable such that, in a fourth range of luminance gradients, the output of the peaked filter is amplified by a constant value. More preferably, the luminance gradients within the fourth range of luminance gradients are smaller than luminance gradients within the third range, and, are larger than the luminance gradients within the second range. Preferably, the constant value is 1.0, however, it would be appreciated by a person skilled in the art that any other constant value, or, substantially constant value may be suitable.

Preferably, the present invention includes a means for measuring a noise value associated with the input luminance signal wherein, the gain function is adjustable relative to the calculated noise value. Also preferably, the means for measuring the noise value includes calculating the sum-of-absolute differences in luminance between adjacent pixels in the inter-pixel array. Also preferably, any absolute differences in luminance between adjacent pixels which are equal to, or greater than, a predetermined threshold value are excluded from the calculation of the noise value. Advantageously, measured values which are equal to, or greater than, the predetermined threshold value are considered to represent edge values and are excluded from the calculation of the sum-of-absolute differences so as not to provide an inaccurate measurement of the noise value.

Preferably, the present invention includes a means for measuring an average luminance of pixels within the inter-pixel array, wherein, the gain function of the gain adjustment circuit is adjustable relative to the measured average luminance. Also preferably, the gain function of the gain adjustment circuit is adjustable relative to the measured average luminance, whereby the first range of luminance gradients attenuated by the gain function increases relative to a decrease in the measured average luminance. Advantageously, the present invention adjusts the gain function of the gain adjustment circuit to increase the chance of coring relatively darker regions of the input luminance signal where noise is more readily visible. Conversely, for regions of the input luminance signal having relatively strong luminance, the gain function is adjusted whereby the region of the input luminance signal is more likely to be peaked.

Preferably, the peaking filter includes a horizontal peaking filter for filtering a horizontal component of the input luminance signal. Preferably, the peaking filter also includes a vertical peaking filter. The peaking filter may also include a two-dimensional peaking filter.

Preferably, the output of the gain adjustment circuit may be amplified by a user-defined gain value.

In a second broad form, the present invention provides a processor for enhancing an input luminance signal including: a means for calculating a noise value associated with the input luminance signal; a means for measuring a luminance gradient associated with the input luminance signal; a peaking filter for processing the input luminance signal; a gain adjustment circuit having a gain function that is adjustable relative to the calculated noise value, the gain adjustment circuit being operable to adjust the magnitude of the output of the peaking filter wherein: in a first range of luminance gradients, the output is an attenuated version of the input; in a second range of luminance gradients the output is directly proportional to the input; in a third range of luminance gradients, the output is inversely proportional to the input; wherein said enhanced luminance signal is the sum of the input and output of the peaking filter.

In a third broad form, the present invention provides a method of enhancing an input luminance signal including the steps of: (i) calculating a chroma edge value associated with the input luminance signal; (ii) measuring a luminance gradient associated with the input luminance signal; (iii) filtering the input luminance signal with a peaking filter; (iv) adjusting a gain function of a gain adjustment circuit relative to the calculated chroma edge value, the gain adjustment circuit being operable to adjust the magnitude of the output of the peaking filter wherein: in a first range of luminance gradients, the output is an attenuated version of the input; in a second range of luminance gradients the output is directly proportional to the input; in a third range of luminance gradients, the output is inversely proportional to the input; wherein said enhanced luminance signal is the sum of the input and output of the peaking filter.

In a fourth broad form, the present invention provides a method of enhancing an input luminance signal including the steps of: (i) calculating a noise value associated with the input luminance signal; (ii) measuring a luminance gradient associated with the input luminance signal; (iii) filtering the input luminance signal with a peaking filter; (iv) adjusting a gain function of a gain adjustment circuit relative to the calculated noise value, the gain adjustment circuit being operable to adjust the magnitude of the output of the peaking filter wherein: in a first range of luminance gradients, the output is an attenuated version of the input; in a second range of luminance gradients the output is directly proportional to the input; in a third range of luminance gradients, the output is inversely proportional to the input; wherein said enhanced luminance signal is the sum of the input and output of the peaking filter.

BRIEF DESCRIPTION OF THE DRAWINGS

The present invention will become more fully understood from the following detailed description of a preferred but non-limiting embodiment thereof, described in connection with the accompanying drawings, wherein:

FIGS. 2A and 2B show a first embodiment of a horizontal and a vertical pixel window respectively used to calculate luminance gradients associated with a current pixel of interest.

FIGS. 3A and 3B show the horizontal and vertical masks of Sobel edge detectors used as chroma edge detectors in the first embodiment of the present invention.

DESCRIPTION OF THE INVENTION

Throughout the specification, the term "peaking" refers to an image enhancement technique whereby "edges" or transition areas within an image are sharpened by selectively emphasizing frequency components of a signal which represents the image. The term "peaking filter" refers to a filter which may emphasize selected frequency bands of a signal relative to other frequency bands within the signal. The term "coring" refers to the suppression of peaking effects across specific frequency components of a signal and is typically employed to minimize the enhancement of noise components within the input luminance signal.

Figure 1:
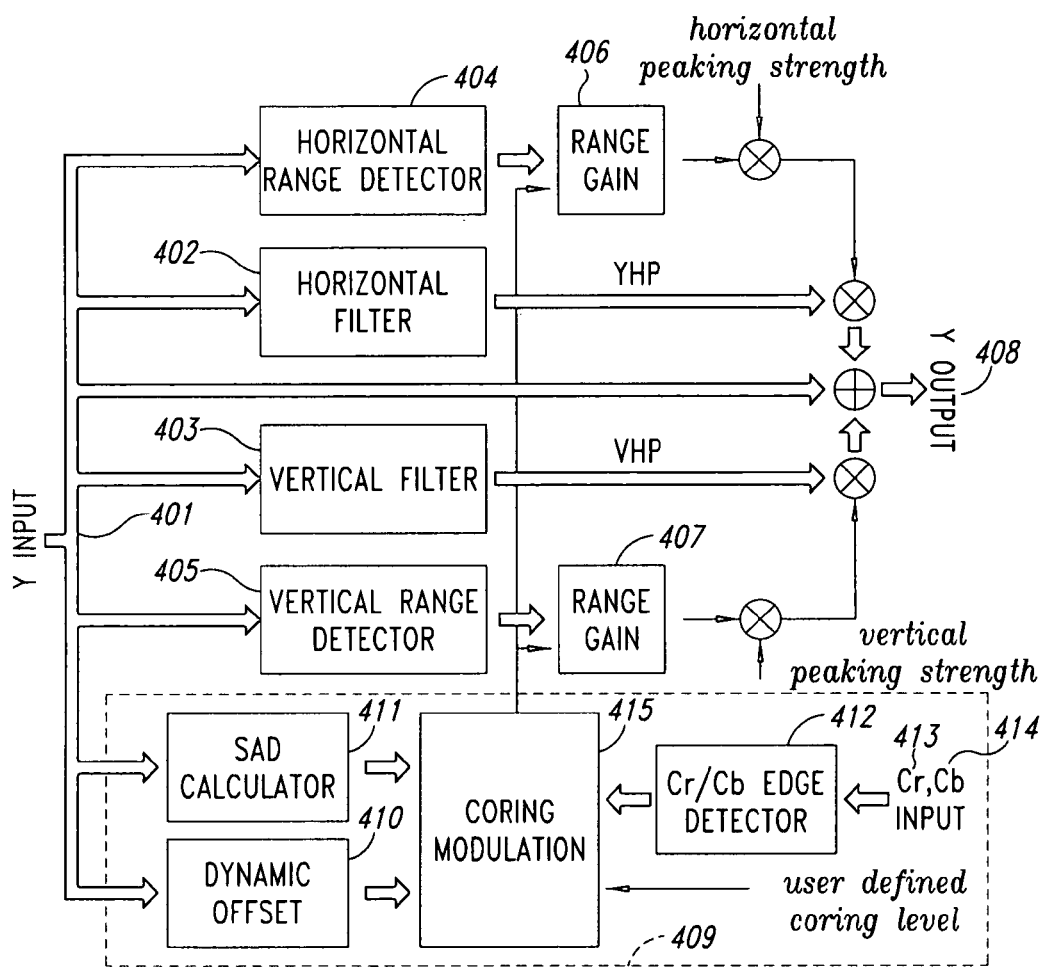
FIG. 1 shows a block diagram of one aspect of a first embodiment of the present invention.

FIG. 1 illustrates a first embodiment of the present invention for processing an input luminance signal (401) such as is produced by a composite signal decoder, an MPEG decoder, or the like. In the present embodiment, the input luminance signal (401) represents a stream of pixel luminance values corresponding to pixels which comprise a two-dimensional image for display. The pixel luminance values are obtained by sampling the input luminance signal using techniques known to persons skilled in the art. The pixel luminance values are stored in a memory array to allow for digital processing of the input luminance signal on a pixel-by-pixel basis. For the purposes of simplicity, the following description describes the processing of a current pixel of interest, and, it would be understood by a person skilled in the art that the present embodiment of the invention processes each successive pixel in a similar manner.

In the present embodiment, a horizontal peaking filter (402) and a vertical peaking filter (403) are arranged in parallel as shown in FIG. 1. The horizontal peaking filter (402) has a gain and phase response which enables the extraction of a frequency band within the input luminance signal (401) in which edge transitions in a horizontal direction of the image are typically present. The horizontal filter (402) may be a band-pass filter with a minimum of 7 taps, or, a high-pass filter with a minimum of 5 taps.

Similarly, the vertical peaking filter (403) extracts a frequency band within the input luminance signal (401) in which edge transitions in a vertical direction of the image are typically present. The vertical peaking filter (403) in this embodiment includes a minimum of 3 taps.

In alternative embodiments of the present invention it would be appreciated by a person skilled in the art that a two-dimensional peaking filter may be used in place of separate horizontal and vertical peaking filters.

A horizontal range detector (404) and a vertical range detector (405) are arranged in parallel with the horizontal and vertical peaking filters (402,403) as shown in FIG. 1. The horizontal and vertical range detectors (404,405) process the same input luminance signal (401) as is fed into the horizontal and vertical peaking filters (402,403). The horizontal range detector (404) outputs a luminance gradient value for the current pixel of interest by examining the luminance characteristics of the pixel relative to its neighboring pixels. In the present embodiment, this is achieved by examining each pixel within a 5×3 pixel window such as is depicted in FIG. 2A. The current pixel of interest is depicted by a shaded box in FIG. 2A and the unshaded boxes represent neighboring pixels in the 5×3 pixel window centered around the current pixel of interest.

The horizontal range detector (404) measures the range (i.e., the difference between the maximum and minimum pixel luminance values) in each of the horizontal lines (A), (B) and (C) of the 5×3 pixel window. The output of the range detector is the luminance gradient of the current pixel of interest which is calculated as the average range across lines (A), (B) and (C) of the pixel window. This process is repeated for each pixel value represented by the input luminance signal in a horizontal direction of the pixel window. In the present embodiment, a smoothing filter is used to provide a luminance gradient for each pixel, although other filters suitable for this purpose may be known to a person skilled in the art.

The vertical range detector (404) operates upon the input luminance signal in a similar manner to the horizontal range detector (405) except that it determines the luminance gradient of each pixel in a vertical direction by reference to a 3×3 pixel window rather than a 5×3 pixel window as shown in FIG. 2B. It is noted that a 3×3 pixel window is applied when measuring the luminance gradient of the current pixel of interest in the vertical direction to provide greater ease of implementation of the present embodiment. For instance, if a 3×5 pixel window were scanned in the vertical direction, this would entail additional memory resources in order to store two additional lines of raster scanning information.

It would be understood by a person skilled in the art that in alternative embodiments of the present invention, the luminance gradient may be calculated using other suitable techniques including the use of a derivative filter.

A first range adjustment circuit (406) receives the output of the horizontal range detector (404), and, a second range adjustment circuit (407) receives the output of the vertical range detector (405).

The magnitude of the gain by which the first and second range adjustment circuits (406,407) will amplify the pixel luminance value of the current pixel of interest will depend upon the luminance gradient associated with the current pixel of interest.

Figure 5A:
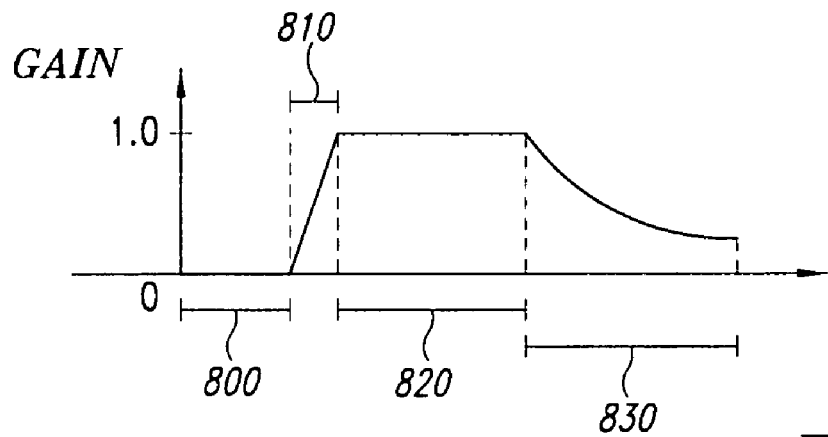
FIGS. 5A to 5C illustrates the relationship between the gain of the gain adjustment circuits and the luminance gradients associated with the pixel of current interest in the first embodiment of the present invention.
Figure 5B:
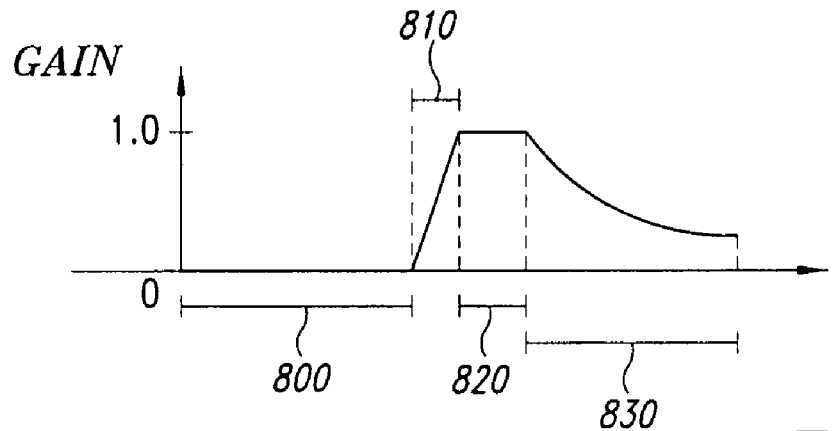
Figure 5C:
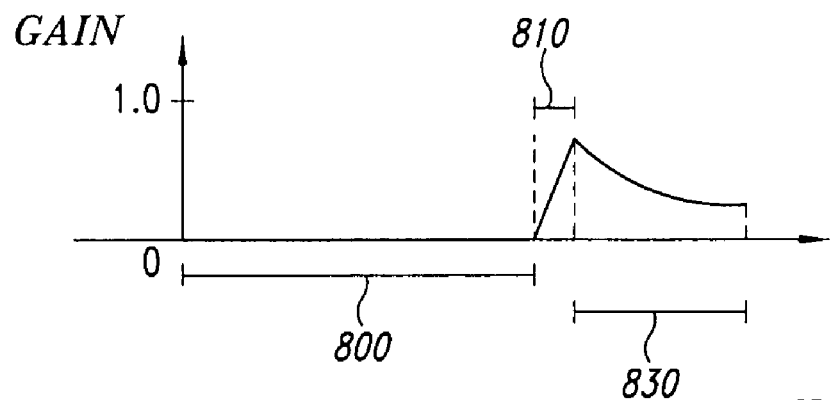

In the present embodiment, the relationship between the luminance gradient of a pixel and the gain with which the gain adjustment circuits (406,407) amplify the pixel luminance is depicted in FIGS. 5A to 5C wherein the gain is plotted along the y-axis, and, luminance gradient values are plotted along the x-axis.

In the present embodiment of the invention, the luminance-gradient vs gain curve includes up to four distinct gain regions. As shown in FIG. 5A, pixels having luminance gradients falling within a first coring range (800) of luminance gradients are attenuated by the gain adjustment circuits. Thus, as the first coring range (800) of luminance gradients is increased, the likelihood that the current pixel of interest will be cored increases.

Pixels having luminance gradients falling within a second range of luminance gradients (810) are scaled proportionally along a positive linear slope. Pixels having luminance gradients falling within a third range of luminance gradients (820) are amplified by a constant gain of 1.0. The third range (820) is intended to allow peaking of components of the input luminance signal representing small edges. Pixels having luminance gradients falling within a fourth range (830) of luminance gradients are amplified proportionally along an exponentially decreasing slope. The fourth range (830) is intended to rapidly decrease the gain provided to components of the input luminance signal representing relatively large edges.

Figure 8A:
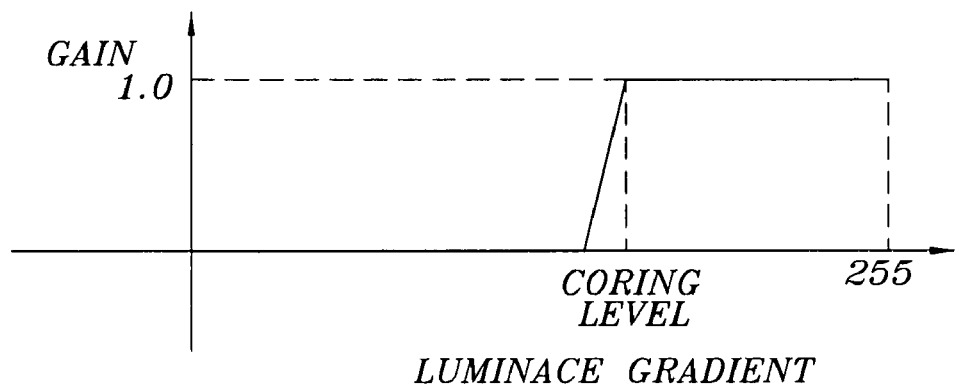
FIGS. 8A and 8B shows the first and second component curves used to generate the luminance gradient vs gain curve of the gain adjustment circuits in the first embodiment of the present invention.
Figure 8B:
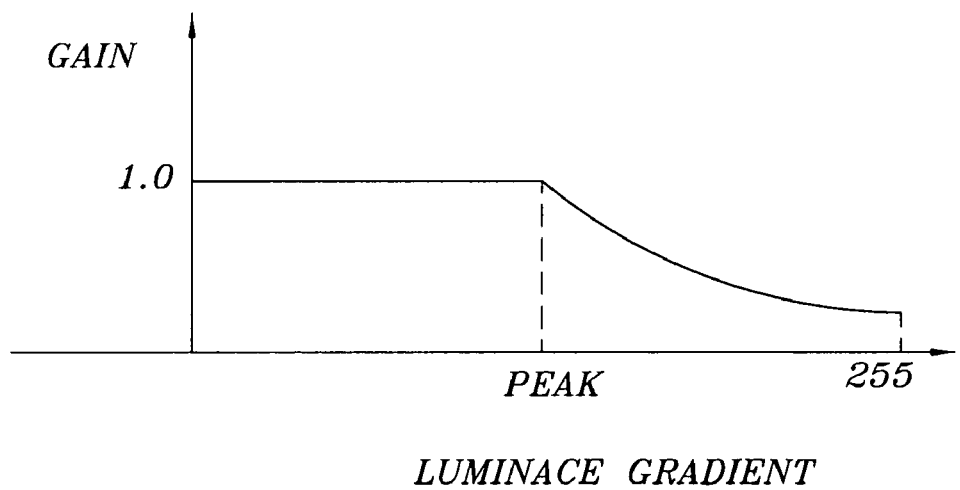

Each of the curves depicted in FIGS. 5A to 5C may be generated by simply over-laying a first component curve and a second component curve as shown in FIGS. 8A and 8B respectively. It would be evident to a person skilled in the art that as the first component curve in FIG. 8A is positively shifted along the x-axis relative to the second component curve, the first range of luminance gradients increases. In the present embodiment, the first coring ranges of the gain adjustment circuits are dynamically adjusted relative to at least one of the following inputs associated with the current pixel of interest:

(i) a noise value associated with the current pixel of interest which in the present embodiment is the sum-of-absolute differences associated with the current pixel of interest within a pixel window;

(ii) a chroma edge value associated with the current pixel of interest;

(iii) a dynamic offset value associated with the current pixel of interest.

In the present embodiment, the noise value associated with the current pixel of interest is calculated as the sum-of-absolute differences (SAD) of horizontally-adjacent pixels within a 5×3 pixel window centered around the current pixel of interest, and, the SAD of vertically-adjacent pixels within a 3×3 pixel window centered around the current pixel of interest.

Figure 7:
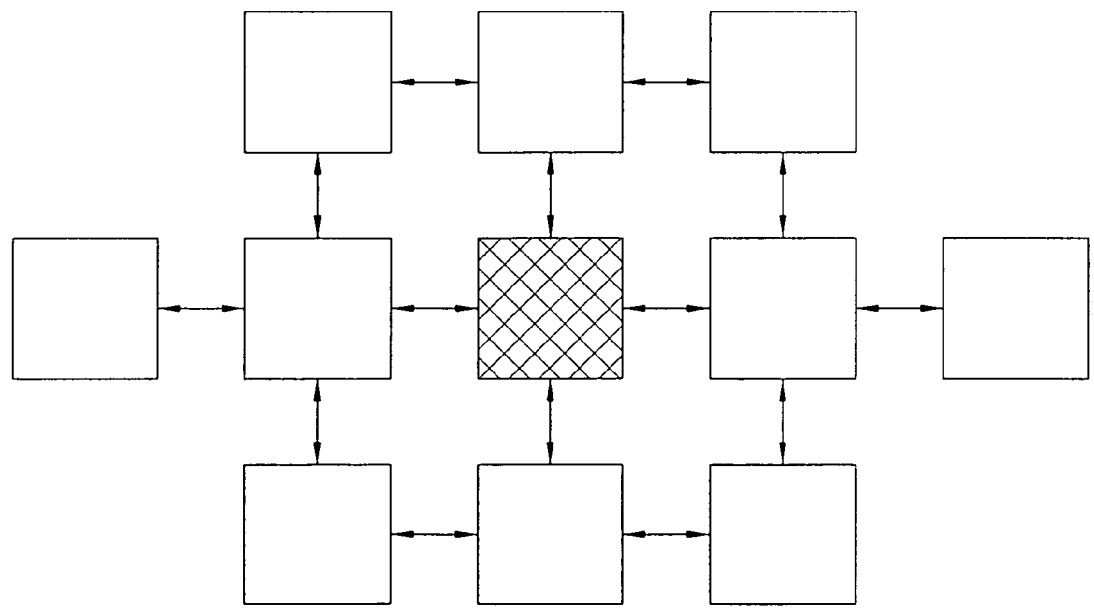
FIG. 7 shows a first embodiment of the pixel windows used to calculate the noise value of a current pixel of interest in the first embodiment of the present invention.

An SAD calculator (411) firstly computes the SAD of inter-pixel luminance values in a horizontal direction for a 5×3 pixel window centered around the current pixel of interest. FIG. 7 shows a pixel window used in the present embodiment for the purposes of measuring the SAD in the horizontal direction within the pixel window. The horizontal SAD is derived by summing up absolute differences between horizontally adjacent pixels as indicated by the bi-directional arrows in FIG. 7. However, where an absolute difference in pixel luminance values between any two horizontally adjacent pixels in the pixel window is greater than a predetermined threshold value (discussed below), the measured absolute difference between the adjacent pixels in question is excluded from the horizontal SAD value. Such differences that are greater than the predetermined threshold are considered to indicate the presence of an edge, and if included in the horizontal SAD value, this would over-state the magnitude of the noise value.

Similarly, an SAD value is calculated for the current pixel of interest in a vertical direction within a 3×3 pixel window centered around the current pixel of interest. The vertical SAD is derived by summing the absolute differences between vertically-adjacent pixels as indicated by bi-directional arrows in FIG. 7 and excludes values which fall below the predetermined threshold.

The noise value associated with the current pixel of interest is ascertained by adding the horizontal SAD value with the vertical SAD value. The SAD calculator (411) used in the present embodiment may be implemented by way of an application specific integrated circuit using techniques which are commonly known to persons skilled in the art and commercially available.

In the present embodiment, the predetermined threshold value is pre-programmed into the SAD calculator (411). A threshold value of 16 is found to be suitable for a broad range of pictures with noise. Higher threshold values tend to give rise to the inclusion of small edges in the noise value total while lower threshold values tend to reduce the effectiveness of the SAD calculator (411) to localized noise.

Chrominance signal residues may also contribute noise to the luminance signal as a result of the imperfect separation of the luminance signal from the chrominance signals Cr and Cb (413,414) when a composite signal (i.e., combined input luminance and associated chrominance signals Cr and Cb) is decoded by a notch-filter. The present embodiment includes a chroma edge detector (412) which is used to compute a chroma edge value from chrominance gradients of chrominance signals Cr (413) and Cb (414) associated with the input luminance signal (401). The gain adjustment circuits (406,407) are dynamically adjusted relative to the calculated chroma edge value.

The chroma edge detector (412) is switched on whenever it detects that the notch filter in the composite signal decoder is in use. In the present embodiment, the chroma edge detector (412) is implemented using a pair of Sobel edge detectors as depicted in FIGS. 3A and 3B which are overlayed as a pair of vertical and horizontal 3×3 pixel masks respectively centered around the current pixel of interest. It would be readily evident to a person skilled in the art that other suitable means of detecting chroma gradients may be used in alternative embodiments.

The horizontal chroma gradient value is computed in accordance with the following steps:
(i) overlap the horizontal 3×3 Sobel mask over the current pixel of interest;
(ii) multiply the mask values by their corresponding pixel luminance values;
(iii) sum, each multiple in the 3×3 window and take the absolute value;

Similarly, the vertical chroma gradient value may be computed in accordance with the following steps:
(i) overlap the vertical 3×3 Sobel mask over the current pixel of interest;
(ii) multiply the mask values by their corresponding pixel luminance values;
(iii) sum each multiple in the 3×3 window and take the absolute value;

The overall chroma edge value is equal to the sum of the absolute gradients computed by the masks in the vertical and horizontal directions. The input chroma sampling format is set at a ratio of 4:2:2 for optimal use of the Sobel edge detectors. However, it would be understood by a person skilled in the art that other suitable edge detector circuits may be used for different chroma sampling formats.

As shown in FIG. 1, the present embodiment also includes a dynamic offset circuit (410) arranged in parallel with the peaking filters (402,403) and the range detectors (404,405) which is switched on in the presence of localized noise around the current pixel of interest. A control signal may be used to activate the dynamic offset circuit (410) when noise is detected around the current pixel of interest. The dynamic offset circuit (410) receives and processes the input luminance signal (401), and outputs a dynamic offset value which contributes toward the dynamic adjustment of the gain adjustment circuits (406,407).

The luminance gradient vs gain curves of the gain adjustment circuits (406,407) are adjusted relative to the dynamic offset value of the current pixel of interest whereby darker regions of an image relative to other regions with similar SAD characteristics, will be more likely to be cored.

Figure 6:
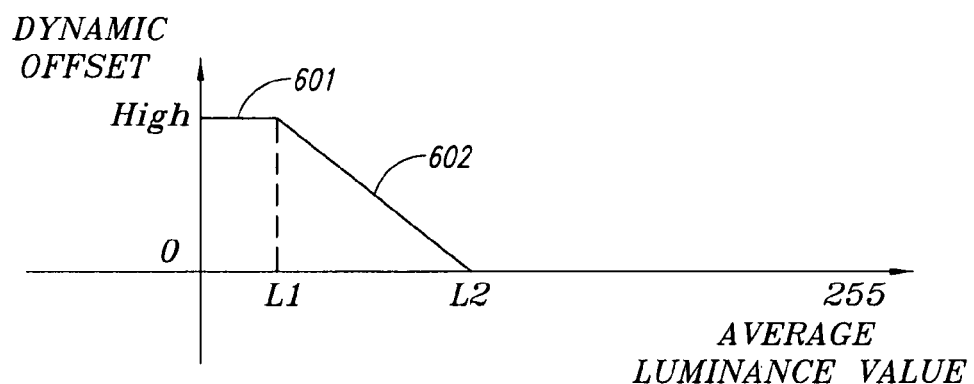
FIG. 6 shows a curve depicting the relationship between the dynamic offset value and the average luminance value as used in the first embodiment of the present invention.

In order to determine the dynamic offset value, an average luminance value is first measured in respect to the current pixel of interest. This is performed by measuring the average luminance of pixel luminance values within a 3×3 pixel window centered around the current pixel of interest. The measured average luminance value (in 8-bit gray-scale) is mapped on to the curve shown in FIG. 6 which depicts the relationship between the average luminance and the dynamic offset value. In the present embodiment, the dynamic offset range is limited to a peak value of 16 whilst points L1 and L2 along the x-axis are set at 16 and 80 (in 8-bit gray-scale) respectively. It is evident from FIG. 6 that the maximum dynamic offset value of 16 is output from the dynamic offset circuit when the average luminance value is 16 or below.

Figure 4:
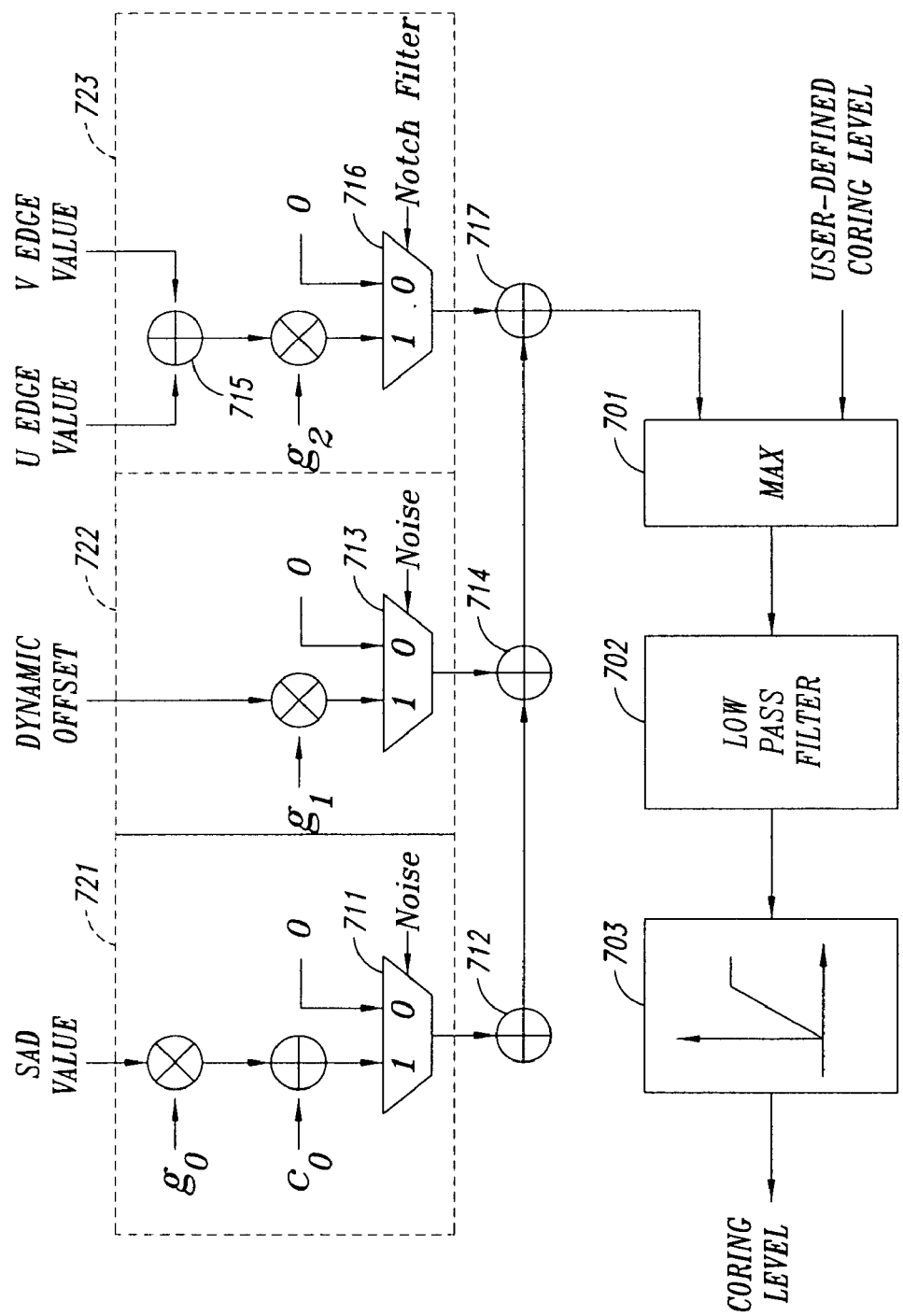
FIG. 4 shows a block diagram of a second aspect of the first embodiment of the present invention.

The noise value, the chroma edge value and the dynamic offset value are weighted by a first, a second, and a third weighting circuit (721,722,723) respectively before being summed to provide a combined gain adjustment value (FIG. 4). The luminance gradient vs gain curves of the gain adjustment circuits (406,407) are adjusted relative to the gain adjustment value. Specifically, in the present embodiment, the first component curve is shifted relative to the second component curve.

The individual effects of each of the noise value, the chroma edge value, and the dynamic offset value upon the first coring ranges of the gain adjustment circuits (406,407) should first be observed, and then weightings should be applied if necessary using the first, the second, and/or the third weighting circuits (721,722,723) respectively.

Referring now to FIG. 4., if noise is detected with respect to the current pixel of interest, the SAD calculator (411) is switched on via multiplexer (711). The first weighting circuit (721) receives the noise value from the SAD calculator (411), multiplies the noise value by a weighting gain $G_0$, adds a value $C_0$ to the noise value, and outputs a weighted noise value.

The weighting gain $G_0$ and offset $C_0$ are manually set such that relatively small edges are not cored by the gain functions of the gain adjustment circuits (406,407), whilst flat regions with local noise are cored. The weighting gain $G_0$ and the offset $C_0$ are manually adjusted in accordance with the following steps:
(i) set the weighting gains $G_1$ and $G_2$ to zero for the second and third weighting circuits respectively. In this way, the effects of the noise value upon the gain function of the gain adjustment circuits can be observed in isolation from the effects of the dynamic offset circuit and the chroma edge detector circuit;

(ii) select a sample input image containing relatively small levels of noise;

(iii) set weighting gain $G_0$ to 1, and, $C_0$ to zero;

(iv) perform relatively strong peaking;

(v) view subjectively the output and carefully observe if noise regions are cored and small edges are not cored;

(vi) decrease the value of weighting gain $G_0$ if regions other than the noise regions are cored or increase $G_0$ if noise regions are not sufficiently cored;

(vii) decrease $C_0$ if small edges are cored;

(viii) repeat steps (iv) to (vii) until it is visually observable that only noise regions are cored and peaking on small edges are recovered.

The dynamic offset value is weighted by a weighting gain $G_1$ to produce a weighted dynamic offset value. The weighting gain $G_1$ of the second weighting circuit is pre-set in the presence of a properly weighted noise value and/or weighted chroma edge value in accordance with the following steps:

(i) select an input image with low noise and significant dark areas;

(ii) set $G_1$ to 1;

(iii) perform relatively strong peaking;

(iv) observe the output on a cathode ray tube display and carefully observe if the noise regions in the dark areas are visible;

(v) increase $G_1$ if dark noise regions are peaked, or, decrease $G_1$ if the other areas of detail are cored;

(vi) repeat steps (iii) to (v) until dark noise regions are cored with affecting peaking performance of other regions.

The third weighting circuit (723) processes the chroma edge value and outputs a weighted chroma edge value. The weighting gain $G_2$ of the weighting circuit (723) is adjusted in accordance with the following steps:

(i) isolate the first and second weighting circuits from the adders (71) and (714) respectively so that the effect of the chroma edge value upon the gain function of the gain adjustment circuits can be observed in isolation. This may be achieved by setting $G_1$, $C_0$ and $G_2$ to zero;

(ii) capture a typical noise-free color-bar test pattern sequence from the output of the composite signal decoder using the notch filter. Chroma residues are readily observable along edges between the colors;

(iii) set weighting gain $G_2$ to 1;

(iv) perform relatively strong peaking;

(v) observe whether the chroma residues are not amplified especially when the sequence is played;

(vi) increase the magnitude of weighting $G_2$ if chroma residues are not cored, or, decrease $G_2$ if chroma residues are cored;

(vii) repeat steps (iv) to (vi) until a value of $G_2$ is determined wherein the chroma residues are observably cored, and below which, chroma residues are amplified.

The weighted outputs of the first, second, and third weighting circuits (721,722,723) are accumulated via adders (712), (714), and (717) and output a coring value. The present embodiment further includes a means for comparing the magnitude of the dynamically-generated coring level with the magnitude of a user-defined coring value wherein the greater of the two coring levels selectively output. The user-defined coring value is generated by a picture-noise-estimator circuit wherein the user-defined coring value is adjusted relative to an estimated picture-noise-value measured for each picture that is displayed. It would be understood that picture-noise-estimator circuits are commonly known by persons skilled in the art. The higher of the two coring values is subsequently processed by a low pass filter (702) such that discontinuities are alleviated between the peaking and the coring of successively processed pixels. The coring value is processed by a saturation circuit (703) which clips the coring value to within a predefined range. In the present embodiment, the coring range is clipped to a range of 0–64 in the gain adjustment circuits (406,407).

The coring value is received by the gain adjustment circuits (406,407) which adjust the first coring ranges in proportion to the received coring value. The gain adjustment circuits amplify the pixel luminance of the current pixel of interest in accordance with the dynamically-adjusted luminance gradient vs gain curve values. It would be understood by a person skilled in the art that calculations involved in adjusting the first coring range of the gain adjustment circuits could be performed using well known operations upon the curve data stored in random-access-memory.

The output of the gain adjustment circuits (406,407) are multiplied by a horizontal and a vertical user-defined gain value respectively before the peaked vertical and horizontal filtered components of the input luminance signal (401) are summed to produce an output signal (408).

All of the above U.S. patents, foreign patent applications, and non-patent publications referred to in this specification and/or listed in the Application Data Sheet are incorporated herein by reference, in their entireties.

Those skilled in the art will appreciate that the invention described herein is susceptible to variations and modifications other than those specifically described without departing from the scope of the invention. All such variations and modification which become apparent to persons skilled in the art, should be considered to fall within the spirit and scope of the invention as broadly hereinbefore described. It is to be understood that the invention includes all such variations and modifications. The invention also includes all of the steps and features, referred or indicated in the specification, individually or- collectively, and any and all combinations of any two or more of said steps or features.

The invention claimed is:

1. A processor for enhancing an input luminance signal including:
   a means for calculating a chroma edge value associated with the input luminance signal;
   a means for measuring a luminance gradient associated with the input luminance signal;
   a peaking filter that receives as an input the input luminance signal and is structured to process the input luminance signal to produce an output;
   a gain adjustment circuit having a gain function that is adjustable relative to the calculated chroma edge value, the gain adjustment circuit being operable to adjust the magnitude of the output of the peaking filter wherein:
      in a first range of luminance gradients, the output is an attenuated version of the input;
      in a second range of luminance gradients the output is directly proportional to the input;
      in a third range of luminance gradients, the output is inversely proportional to the input;
   wherein said enhanced luminance signal is the sum of the input and output of the peaking filter.

2. A processor as claimed in claim 1 wherein the input luminance signal represents an inter-pixel array for display.

3. A processor as claimed in claim 2 wherein the luminance gradient corresponds to the difference between a maximum and a minimum pixel luminance within the inter-pixel array.

4. A processor as claimed in claim 2, including a means for measuring an average luminance of pixels within the inter-pixel array, wherein, the gain function of the gain adjustment circuit is adjustable relative to the measured average luminance.

5. A processor as claimed in claim 4 wherein the gain function of the gain adjustment circuit is adjustable relative to the measured average luminance, whereby the first range of luminance gradients attenuated by the gain function increases relative to a decrease in the measured average luminance.

6. A processor as claimed in claim 1 wherein the means for calculating the chroma edge value includes a means for calculating the sum of chroma gradients of a first and a second chroma signal associated with the input luminance signal.

7. A processor as claimed in claim 1 wherein the means for calculating the chroma edge value includes an edge detector.

8. A processor as claimed in claim 7 wherein the edge detector includes a pair of Sobel detectors.

9. A processor as claimed in claim 1 wherein the luminance gradients within the first range are smaller than the luminance gradients within the second range, and, the luminance gradients within the second range are smaller than the luminance gradients within the third range.

10. A processor as claimed in claim 1 wherein the gain function of the gain adjustment circuit is further adjustable such that, in a fourth range of luminance gradients, the output of the peaked filter is amplified by a constant value.

11. A processor as claimed in claim 10 wherein the luminance gradients within the fourth range of the luminance gradients are smaller than the luminance gradients within the third range, and, are larger than the luminance gradients within the second range.

12. A processor as claimed in claim 10 wherein the constant value is 1.0.

13. A processor as claimed in claim 1, including a means for measuring a noise value associated with the input luminance signal wherein, the gain function of the gain adjustment circuit is adjustable relative to the calculated noise value.

14. A processor as claimed in claim 13 wherein the means for measuring the noise value includes means for calculating the sum-of-absolute differences in luminance between adjacent pixels in the inter-pixel array.

15. A processor as claimed in claim 14 wherein absolute differences in luminance between adjacent pixels which are greater than, or equal to, a predetermined threshold value are not included in the calculation of the noise value.

16. A processor as claimed in claim 1 wherein the peaking filter includes a horizontal peaking filter for filtering a horizontal component of the input luminance signal.

17. A processor as claimed in claim 1 wherein the peaking filter includes a vertical peaking filter for filtering a vertical component of the input luminance signal.

18. A processor as claimed in claim 1 wherein the peaking filter includes a two-dimensional peaking filter a horizontal and a vertical component of the input luminance signal.

19. A processor as claimed in claim 1 wherein the output of the gain adjustment circuit may be amplified by a user-defined gain value.

20. A processor for enhancing an input luminance signal, including:
a means for calculating a noise value associated with the input luminance signal;
a means for measuring a luminance gradient associated with the input luminance signal;
a peaking filter that receives as an input the input luminance signal and is structured to process the input luminance signal to produce an output;
a gain adjustment circuit having a gain function that is adjustable relative to the calculated noise value, the gain adjustment circuit being operable to adjust the magnitude of the output of the peaking filter wherein:
in a first range of luminance gradients, the output is an attenuated version of the input;
in a second range of luminance gradients the output is directly proportional to the input;
in a third range of luminance gradients, the output is inversely proportional to the input;
wherein said enhanced luminance signal is the sum of the input and output of the peaking filter.

21. A processor as claimed in claim 20 wherein the input luminance signal represents an inter-pixel array for display.

22. A processor as claimed in claim 21 wherein the means for calculating the noise value includes a means for measuring a sum-of-absolute differences in luminances between pixels in the inter-pixel array.

23. A processor as claimed in claim 21 wherein absolute differences in luminance between pixels which are equal to, or greater than, a predetermined threshold are excluded from the calculation of the noise value.

24. A processor as claimed in claim 21 wherein the luminance gradient corresponds to the difference between a maximum and a minimum pixel luminance within the inter-pixel array.

25. A processor as claimed in claim 21, including a means for measuring an average luminance of pixels within the inter-pixel array, wherein, the gain function of the gain adjustment circuit is adjustable relative to the measured average luminance.

26. A processor as claimed in claim 25 wherein the first range of luminance gradients attenuated by the gain function increases relative to a decrease in the measured average luminance.

27. A processor as claimed in claim 20, including a means for measuring a chroma edge value associated with the input luminance signal, wherein, the gain function of the gain adjustment circuit is adjustable relative to the calculated chroma edge value.

28. A processor as claimed in claim 27 wherein the means for calculating the chroma edge value includes a means for measuring the sum of gradients of a first and a second chroma signal associated with the input luminance signal.

29. A processor as claimed in claim 20 wherein the means for calculating the chroma edge value includes an edge detector.

30. A processor as claimed in claim 29 wherein the edge detector includes a pair of Sobel detectors.

31. A processor as claimed in claim 20 wherein the luminance gradients within the first range are smaller than the luminance gradients within the second range, and, the luminance gradients within the second range are smaller than the luminance gradients within the third range.

32. A processor as claimed in claim 20 wherein the gain function of the gain adjustment circuit is further adjustable such that, in a fourth range of luminance gradients, the output of the peaked filter is amplified by a constant amplitude.

33. A processor as claimed in claim 32 wherein the constant value is 1.0.

34. A processor as claimed in claim 20 wherein the peaking filter includes a horizontal peaking filter for filtering a horizontal component of the input luminance signal.

35. A processor as claimed in claim 20 wherein the peaking filter includes a vertical peaking filter for filtering a vertical component of the input luminance signal.

36. A processor as claimed in claim 20 wherein the peaking filter includes a two-dimensional peaking filter for filtering a horizontal and a vertical component of the input luminance signal.

37. A processor as claimed in claim 20 wherein the output of the gain adjustment circuit may be amplified by a user-defined gain value.

38. A method of enhancing an input luminance signal including the steps of:
   calculating a chroma edge value associated with the input luminance signal;
   measuring a luminance gradient associated with the input luminance signal;
   filtering the input luminance signal with a peaking filter;
   adjusting a gain function of a gain adjustment circuit relative to the calculated chroma edge value, the gain adjustment circuit being operable to adjust the magnitude of an output of the peaking filter wherein:
      in a first range of luminance gradients, the output is an attenuated version of an input of the peaking filter;
      in a second range of luminance gradients the output is directly proportional to the input;
      in a third range of luminance gradients, the output is inversely proportional to the input;
   wherein said enhanced luminance signal is the sum of the input and output of the peaking filter.

39. A method as claimed in claim 38 wherein the input luminance signal represents an inter-pixel array for display.

40. A method as claimed in claim 39 wherein the luminance gradient corresponds to the difference between a maximum and a minimum pixel luminance within the inter-pixel array.

41. A method as claimed in claim 39, including the step of measuring an average luminance of pixels within the inter-pixel array, wherein, the gain function of the gain adjustment circuit is adjustable relative to the measured average luminance.

42. A method as claimed in claim 41 wherein the gain function of the gain adjustment circuit is adjustable relative to the measured average luminance, whereby the first range of luminance gradients attenuated by the gain function increases relative to a decrease in the measured average luminance.

43. A method as claimed in claim 38 wherein the step of calculating the chroma edge value includes calculating the sum of chroma gradients of a first and a second chroma signal associated with the input luminance signal.

44. A method as claimed in claim 38 wherein the step of calculating the chroma edge value includes using an edge detector.

45. A method as claimed in claim 44 wherein the edge detector includes a pair of Sobel detectors.

46. A method as claimed in claim 38 wherein the luminance gradients within the first range are smaller than the luminance gradients within the second range, and, the luminance gradients within the second range are smaller than the luminance gradients within the third range.

47. A method as claimed in claim 38 wherein the gain adjustment circuit is further adjustable such that, in a fourth range of luminance gradients, the output of the peaked filter is amplified by a constant value.

48. A method as claimed in claim 47 wherein luminance gradients within the fourth range of luminance gradients are smaller than luminance gradients within the third range, and, are larger than the luminance gradients within the second range.

49. A method as claimed in claim 47 wherein the constant value is 1.0.

50. A method as claimed in claim 38 including the step of measuring a noise value associated with the input luminance signal wherein, the gain function is adjustable relative to the calculated noise value.

51. A method as claimed in claim 50 wherein the step of measuring the noise value includes calculating the sum-of-absolute differences in luminance between adjacent pixels in the inter-pixel array.

52. A method as claimed in claim 51 wherein absolute differences in luminance between adjacent pixels which are equal to, or greater than, a predetermined threshold value are excluded from the calculation of the noise value.

53. A method as claimed in claim 38 wherein the peaking filter includes a horizontal peaking filter for filtering a horizontal component of the input luminance signal.

54. A method as claimed in claim 38 wherein the peaking filter includes a vertical peaking filter for filtering a vertical component of the input luminance signal.

55. A method as claimed in claim 38 wherein the peaking filter includes a two-dimensional peaking filter for filtering a horizontal and a vertical component of the input luminance signal.

56. A method as claimed in claim 38 wherein the output of the gain adjustment circuit may be amplified by a user-defined gain value.

57. A method of enhancing an input luminance signal, including the steps of:
   calculating a noise value associated with the input luminance signal;
   measuring a luminance gradient associated with the input luminance signal;
   filtering the input luminance signal with a peaking filter to produce an output;
   adjusting a gain function of a gain adjustment circuit relative to the calculated noise value, the gain adjustment circuit being operable to adjust the magnitude of the output of the peaking filter wherein:
      in a first range of luminance gradients, the output is an attenuated version of the input;
      in a second range of luminance gradients the output is directly proportional to the input;
      in a third range of luminance gradients, the output is inversely proportional to the input;
   wherein said enhanced luminance signal is the sum of the input and output of the peaking filter.

58. A method as claimed in claim 57 wherein the input luminance signal represents an inter-pixel array for display.

59. A method as claimed in claim 58 wherein the step of calculating the noise value includes measuring a sum-of-absolute differences in luminances between pixels in the inter-pixel array.

60. A method as claimed in claim 58 wherein absolute differences in luminance between pixels which fall below a predetermined threshold are excluded from the calculation of the noise value.

61. A method as claimed in claim 58 including the step of measuring an average luminance of pixels within the inter-pixel array, wherein, the gain function of the gain adjustment circuit is adjustable relative to the measured average luminance.

62. A method as claimed in claim 61 wherein, the first range of luminance gradients attenuated by the gain function increases relative to a decrease in the measured average luminance.

63. A method as claimed in claim 57 including the step of calculating a chroma edge value associated with the input luminance signal, wherein, the gain function of the gain adjustment circuit is adjustable relative to the calculated chroma edge value.

64. A method as claimed in claim 63 wherein the step of calculating the chroma edge value includes calculating the sum of gradients of a first and a second chroma signal associated with the input luminance signal.

65. A method as claimed in claim 57 wherein the step of calculating the chroma edge value includes using an edge detector.

66. A method as claimed in claim 65 wherein the edge detector includes a pair of Sobel detectors.

67. A method as claimed in claim 57 wherein the luminance gradient corresponds to the difference between a maximum and a minimum pixel luminance within the inter-pixel array.

68. A method as claimed in claim 57 wherein the luminance gradients within the first range are smaller than the luminance gradients within the second range, and, the luminance gradients within the second range are smaller than the luminance gradients within the third range.

69. A method as claimed in claim 57 wherein the gain function of the gain adjustment circuit is further adjustable such that, in a fourth range of luminance gradients, the output of the peaked filter is amplified by a constant amplitude.

70. A method as claimed in claim 69 wherein the constant value is 1.0.

71. A method as claimed in claim 57 wherein the peaking filter includes a horizontal peaking filter for filtering a horizontal component of the input luminance signal.

72. A method as claimed in claim 57 wherein the peaking filter includes a vertical peaking filter for filtering a vertical component of the input luminance signal.

73. A processor as claimed in claim 57 wherein the peaking filter includes a two-dimensional peaking filter for filtering a vertical and a horizontal component of the input luminance signal.

74. A method as claimed in claim 57 wherein the output of the gain adjustment circuit may be amplified by a user-defined gain value.

* * * * *